United States Patent
Liu et al.

(10) Patent No.: US 9,051,222 B1
(45) Date of Patent: Jun. 9, 2015

(54) SLOW AND CONTROLLED RELEASE POLYMERIC SULFUR FERTILIZER CONTAINING MULTIPLE NUTRIENT ELEMENTS AND METHOD FOR PREPARING THE SAME

(71) Applicant: North University of China, Taiyuan (CN)

(72) Inventors: Yaqing Liu, Taiyuan (CN); Guizhe Zhao, Taiyuan (CN); Dongdong Cheng, Taiyuan (CN); Lifeng Zhou, Taiyuan (CN); Denghui Wu, Taiyuan (CN)

(73) Assignee: North University of China, Taiyuan (CN)

( * ) Notice: Subject to any disclaimer, the term of this patent is extended or adjusted under 35 U.S.C. 154(b) by 0 days.

(21) Appl. No.: 14/520,107

(22) Filed: Oct. 21, 2014

(30) Foreign Application Priority Data

Feb. 20, 2014 (CN) .......................... 2014 1 0058904

(51) Int. Cl.
*C08G 75/00* (2006.01)
*C05B 17/00* (2006.01)

(52) U.S. Cl.
CPC .................... *C05B 17/00* (2013.01)

(58) Field of Classification Search
USPC .................... 71/28, 29, 32, 33, 35, 36
See application file for complete search history.

(56) References Cited

FOREIGN PATENT DOCUMENTS

CN          102584474 A    *   7/2012    ............... C05G 3/00

* cited by examiner

*Primary Examiner* — Shane Fang
(74) *Attorney, Agent, or Firm* — Lathrop & Gage LLP

(57) ABSTRACT

The present invention provides a slow and controlled release polymeric sulfur fertilizer containing multiple nutrient elements. The slow and controlled release polymeric sulfur fertilizer is represented by the following formula, in which m=1-4, and n=100-210. The element sulfur in the slow and controlled release polymeric sulfur fertilizer according to embodiments of the present invention has very high utilization rate.

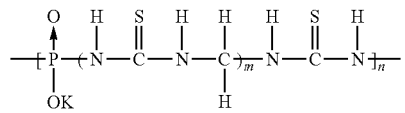

10 Claims, 7 Drawing Sheets universal peak table for unknown sample with wide distribution

| Name | Mv (Dalton) | $M_n$ (Dalton) | $M_w$ (Dalton) | $M_z$ (Dalton) | $M_{z+1}$ (Dalton) | Polydispersity |
|---|---|---|---|---|---|---|
| | | 4737 | 53005 | 75717 | 82717 | 11.189417 |

SLOW AND CONTROLLED RELEASE POLYMERIC SULFUR FERTILIZER CONTAINING MULTIPLE NUTRIENT ELEMENTS AND METHOD FOR PREPARING THE SAME

CROSS-REFERENCE TO RELATED APPLICATION

This application claims priority to and benefits of Chinese Patent Application No. 201410058904.X, filed with the State Intellectual Property Office of P. R. China on Feb. 20, 2014, the entire content of which is incorporated herein by reference.

FIELD

The present invention relates to the field of biochemistry, and more particularly to a slow and controlled release polymeric sulfur fertilizer containing multiple nutrient elements and a method of preparing the slow and controlled release polymeric sulfur fertilizer.

BACKGROUND

Sulfur is the fourth important element for the growth of crops, the importance of which is only smaller than that of the three basic mineral elements. The main effect of sulfur includes: 1) sulfur is a component of three sulfur-containing amino acids in the plants (i.e. cysteine, cysteine and methionine), which determines the amount, quality and functions of proteins in the plant and influences the structure of the cellular protoplasm, cold and dry resistances of the plant as well as the quality of the crops, etc. Sulfur is involved in the synthesis of the chlorophyll in plants as well as some important metabolism polymer compounds, such as enzyme, coenzyme A, vitamin H and vitamin B. 2) Sulfur plays an important role in various important metabolism processes in cells of the plant. For example, sulfur transfers electrons during the photosynthesis and the reduction of oxides like nitrite; and sulfur improves nitrogen metabolism and supply of sugar during a process of biological nitrogen fixation, which facilitates the nitrogen fixing effect of *rhizobium* and *azotobacter*. During the absorption of nutrients, sulfur influences the absorption of other elements in the plant via an antagonistic action or a synergism. 3) The fragrant and pungent smells as well as toxicity of certain plants are all related to sulfur-containing compounds. To some extent, sulfur can provide the plant with self-protection, and prevent the plant from the attacks of insects and animals. It is reported that, glutathione and non-protein hydrosulfide may be the main components in the plant which are capable of removing the damage from heavy metal chromium. The above-mentioned components all contain element sulfur, therefore sulfur also has the function of detoxication.

Sulfur is essential to the growth and metabolism of the plant. Due to the high centralization of agriculture, the removal of large amount of nutrients per unit area as well as the increase application of high-density sulfur-free fertilizer, however, the lack of sulfur in the soil is becoming increasingly serious. Therefore it is urgent to use sulfur fertilizers. According to a series of latest practical tests which applies sulfur fertilizer based on the application of nitrogen fertilizer, it is indicated that the sulfur fertilizer may increase the yield of plant, improve the quality of soil, keep the plant healthy, improve the quality of the crops and increase the utility of other nutrients.

Currently, a common sulfur-containing fertilizer includes ammonium sulfate, potassium sulfate, potassium magnesium sulfate, and superphosphate. However, the utilization rate of element sulfur in these sulfur-containing fertilizers is low. In connection with the practical requirements of agricultural production and environmental protection, there is more and more research on environmental fertilizer containing higher amounts of sulfur. Nowadays, there are a lot of slow and controlled release fertilizers which apply sulfur on the outer surface of particles of the fertilizer, among which urea is the most common one. However, the sulfur coatings applied on the particles of urea are easy to fall off. In addition, the sealing agent and modifying agent are both hard to absorb by the plant.

Therefore, there is still a need for further modifying fertilizer containing sulfur.

SUMMARY

Embodiments of the present invention seek to solve at least one of the problems existing in the prior art to at least some extent. To this end, an object of the present invention is to provide a slow and controlled release polymeric sulfur fertilizer containing multiple nutrient elements and a method for preparing the slow and controlled release polymeric sulfur fertilizer. Element sulfur has improved utilization rate in the slow and controlled release polymeric sulfur fertilizer.

In one aspect of the present invention, a slow and controlled release polymeric sulfur fertilizer comprising multiple nutrient elements is provided. The slow and controlled release polymeric sulfur fertilizer may be represented by the following formula:

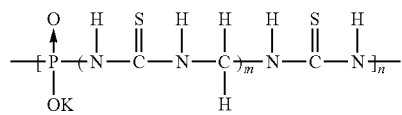

in which m=1-4, and n=100-210.

According to embodiments of the present invention, element sulfur in the slow and controlled release polymeric sulfur fertilizer is present in the form of C=S double bonds, which is easier to be converted to cystine or cysteine which is then absorbed by the plant and becomes an essential protein component for a plant organism. Therefore, the utilization rate of element sulfur may be higher. In addition, elements of sulfur, nitrogen, phosphor and potassium are fixed in the same polymer chain by chemical bonds, then the slow and controlled release polymeric sulfur fertilizer may have excellent slow and controlled release performances. Also, the leaching loss may be reduced. Therefore, the utilization rate of the slow and controlled release polymeric sulfur fertilizer may be significantly improved. In addition, as the gradual hydrolysis of the slow and controlled release polymeric sulfur fertilizer after being dispersed into the soil, the slow and controlled release polymeric sulfur fertilizer may degrade into small molecular matters which may be absorbed and utilized by the plant. There are no harmful substances left after using slow and controlled release polymeric sulfur fertilizer, therefore the slow and controlled release polymeric sulfur fertilizer may be used as an environmental friendly fertilizer.

Further, the slow and controlled release polymeric sulfur fertilizer according to embodiments of the present invention may have the following additional features.

In some embodiments of the present invention, the contents of sulfur, nitrogen, phosphor and potassium in the slow and controlled release polymeric sulfur fertilizer may be: 24-30 wt % of sulfur; 21-27 wt % of nitrogen; 13-27 wt % of phosphor based on $P_2O_5$; and 9-18 wt % of potassium based on $K_2O$.

In some embodiments of the present invention, the slow and controlled release polymeric sulfur fertilizer may have an average molecular weight from 52800 Daltons to 55440 Daltons.

In another aspect of the present invention, a method for preparing the slow and controlled release polymeric sulfur fertilizer containing multiple nutrient elements is provided. The method may include steps of:

1) reacting formaldehyde with thiourea at a pH value from 8 to 10 at a first temperature from 30° C. to 35° C. for 3 h, then increasing the first temperature to a second temperature from 80° C. to 90° C., and keeping the reaction at the second temperature for a time from 20 min to 30 min to form a preliminary product;
2) adding a potassium phosphate into the preliminary product obtained from step 1) and keeping said reaction for a time from 180 min to 270 min to form the slow and controlled release polymeric sulfur fertilizer.

With the above-identified method, the slow and controlled release polymeric sulfur fertilizer containing multiple nutrient elements may be prepared efficiently.

Further, the method for preparing the slow and controlled release polymeric sulfur fertilizer containing multiple nutrient elements according to embodiments of the present invention may have the following additional features.

In some embodiments of the present invention, in the step 1), the molar ratio between the thiourea and the formaldehyde may be from 5:4 to 2:1, preferably the molar ratio between the thiourea and the formaldehyde may be 5:4. Then the slow and controlled release polymeric sulfur fertilizer may be prepared efficiently.

In some embodiments of the present invention, the amount of the potassium phosphate may be ⅕ of the molar weight of the thiourea. Then the slow and controlled release polymeric sulfur fertilizer may further be prepared efficiently.

In some embodiments of the present invention, the potassium phosphate may be at least one selected from the group consisting of potassium dihydrogen phosphate and dipotassium hydrogen phosphate, preferably potassium dihydrogen phosphate. Then the slow and controlled release polymeric sulfur fertilizer may further be prepared efficiently.

In some embodiments of the present invention, the method may further include a step: 3) granulating the slow and controlled release polymeric sulfur fertilizer obtained from step 2). Then the slow and controlled release polymeric sulfur fertilizer may further be prepared efficiently.

Additional aspects and advantages of embodiments of present invention will be given in part in the following descriptions, become apparent in part from the following descriptions, or be learned from the practice of the embodiments of the present invention.

DETAILED DESCRIPTION

Figure 1:
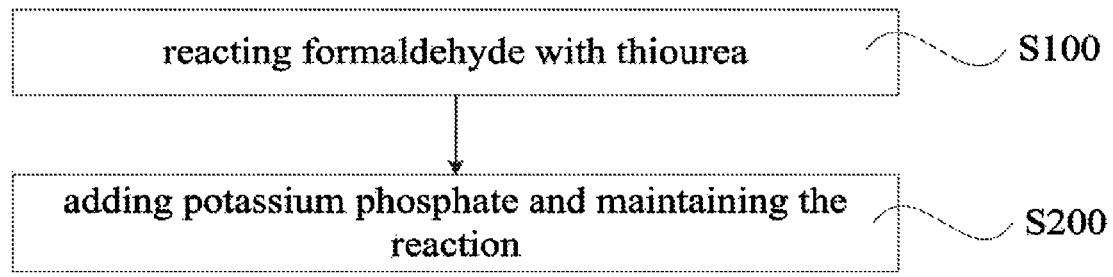
FIG. 1 is a flow chart illustrating a method for preparing slow and controlled release polymeric sulfur fertilizer containing multiple nutrient elements according to an embodiment of the present invention.

Reference will be made in detail to embodiments of the present invention. The embodiments described herein with reference to drawings are explanatory, illustrative, and used to generally understand the present invention. The embodiments shall not be construed to limit the present invention. In addition, unless specified or limited otherwise, all reactants applied in the following embodiments may both commercially available or be prepared as described in the present invention or according to commonly known methods. As to the reaction conditions which are not listed, they are known to a person having ordinary skill in the art.

In an aspect of the present invention, a slow and controlled release polymeric sulfur fertilizer comprising multiple nutrient elements is provided. According to embodiments of the present invention, the slow and controlled release polymeric sulfur fertilizer may be represented by the following formula:

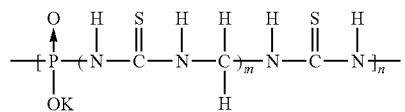

in which m=1-4, and n=100-210.

According to embodiments of the present invention, element sulfur in the slow and controlled release polymeric sulfur fertilizer is present in the form of C=S double bonds, which is easier to be converted to cystine or cysteine which is then absorbed by the plant and then becomes an essential protein component for a plant organism. Therefore, the utilization rate of element sulfur may be higher. In addition, elements of sulfur, nitrogen, phosphor and potassium are fixed in the same polymer chain by chemical bonds, then the slow and controlled release polymeric sulfur fertilizer may have excellent slow and controlled release performances. Also, the leaching loss may be reduced. Therefore, the utilization rate of the slow and controlled release polymeric sulfur fertilizer may be significantly improved. In addition, as the gradual hydrolysis of the slow and controlled release polymeric sulfur fertilizer after being dispersed into the soil, the slow and controlled release polymeric sulfur fertilizer may degrade into small molecular matters which may be absorbed and utilized by the plant. There are no harmful substances left after using slow and controlled release polymeric sulfur fertilizer, therefore the slow and controlled release polymeric sulfur fertilizer may be used as an environmental friendly fertilizer.

According to embodiments of the present invention, there are no special limits to the contents of sulfur, nitrogen, phosphor and potassium in the slow and controlled release polymeric sulfur fertilizer. In some embodiments, the contents of sulfur, nitrogen, phosphor and potassium in the slow and controlled release polymeric sulfur fertilizer may be: 24-30 wt % of sulfur; 21-27 wt % of nitrogen; 13-27 wt % of phosphor based on $P_2O_5$; and 9-18 wt % of potassium based on $K_2O$.

According to embodiments of the present invention, there are no special limits to the average molecular weight of the slow and controlled release polymeric sulfur fertilizer. In some embodiments of the present invention, the slow and controlled release polymeric sulfur fertilizer may have an average molecular weight from 52800 Daltons to 55440 Daltons. The inventors have found that, the average molecular weight may have a great influence on the contents, release rate and release period of nutrient elements in the slow and controlled release polymeric sulfur fertilizer, and the slow and controlled release polymeric sulfur fertilizer having the above-mentioned nutrient elements may have optimized performances.

According to embodiments of the present invention, the contents of sulfur, nitrogen, phosphor and potassium in the slow and controlled release polymeric sulfur fertilizer may vary in a proper range. For example, when m=1 and n=210, in the slow and controlled release polymeric sulfur fertilizer, the content of sulfur may be 24 wt %, the content of nitrogen may be 21 wt %, the content of phosphor based on $P_2O_5$ may be 27 wt %, and the content of potassium based on $K_2O$ may be 18 wt %, and the slow and controlled release polymeric sulfur fertilizer may have an average molecular weight of 55440. When m=2 and n=150, in the slow and controlled release polymeric sulfur fertilizer, the content of sulfur may be 27 wt %, the content of nitrogen may be 24 wt %, the content of phosphor based on $P_2O_5$ may be 20 wt %, and the content of potassium based on $K_2O$ may be 13 wt %, and the slow and controlled release polymeric sulfur fertilizer may have an average molecular weight of 52800. When m=3 and n=120, in the slow and controlled release polymeric sulfur fertilizer, the content of sulfur may be 29 wt %, the content of nitrogen may be 25 wt %, the content of phosphor based on $P_2O_5$ may be 11 wt %, and the content of potassium based on $K_2O$ may be 7 wt %, and the slow and controlled release polymeric sulfur fertilizer may have an average molecular weight of 52800. When m=4 and n=100, in the slow and controlled release polymeric sulfur fertilizer, the content of sulfur may be 30 wt %, the content of nitrogen may be 27 wt %, the content of phosphor based on $P_2O_5$ may be 13 wt %, and the content of potassium based on $K_2O$ may be 9 wt %, and the slow and controlled release polymeric sulfur fertilizer may have an average molecular weight of 52800.

In a second aspect of the present invention, a method for preparing the slow and controlled release polymeric sulfur fertilizer containing multiple nutrient elements is provided. The method for preparing the slow and controlled release polymeric sulfur fertilizer may be described in detail with reference to FIGS. 1 to 2. According to embodiments of the present invention, the method may include:

Step S100: reacting formaldehyde with thiourea.

According to embodiments of the present invention, there are no special limits to the conditions of the reaction between formaldehyde and thiourea. According to a specific embodiment of the present invention, the condition of the reaction between formaldehyde and thiourea may include: reacting formaldehyde with thiourea at a pH value from 8 to 10 at a first temperature from 30° C. to 35° C. for 3 h, then increasing the first temperature to a second temperature from 80° C. to 90° C., and keeping the reacting at the second temperature for a time from 20 min to 30 min to form a preliminary product.

According to embodiments of the present invention, there are no special limits to the amounts of formaldehyde and thiourea. According to a specific embodiment of the present invention, the molar ratio between the thiourea and the formaldehyde may be from 5:4 to 2:1, for example, the molar ratio between the thiourea and the formaldehyde may be 5:4. According to embodiments of the present invention, the pH value of the reacting system may be adjusted by a pH modifier. There are no special limits to the specific type of the pH modifier, in some embodiments of the present invention, the pH value of the reaction system may be regulated with an alkaline solution, for example, those selected from potassium hydroxide, sodium hydroxide, and so on. In this step, specifically, the reacting may be presented by the following chemical equation:

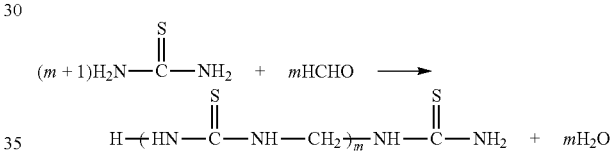

in which: m=1-4.

Step S200: adding potassium phosphate and maintaining the reaction.

According to embodiments of the present invention, a potassium phosphate is added into the preliminary product obtained from step 1) and said reaction is kept for a time from 180 min to 270 min, so that the slow and controlled release polymeric sulfur fertilizer in the form of a viscous solution may be formed. According to embodiments of the present invention, there are no special limits to the amount of the potassium phosphate. In some embodiments of the present invention, the amount of the potassium phosphate may be ⅕ of the molar weight of the thiourea. Then the slow and controlled release polymeric sulfur fertilizer may further be prepared efficiently. According to embodiments of the present invention, there are no special limits to the specific type of the potassium phosphate. According to a specific embodiment of the present invention, the potassium phosphate may be at least one selected from potassium dihydrogen phosphate and dipotassium hydrogen phosphate, for example, the potassium phosphate may be potassium dihydrogen phosphate. In this step, specifically, a reaction represented by the following chemical equation may be caused:

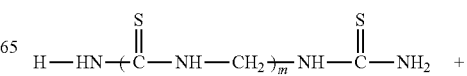

-continued

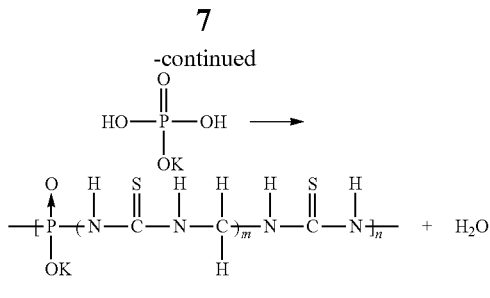

in which: m=1-4, n=100-210.

Figure 2:
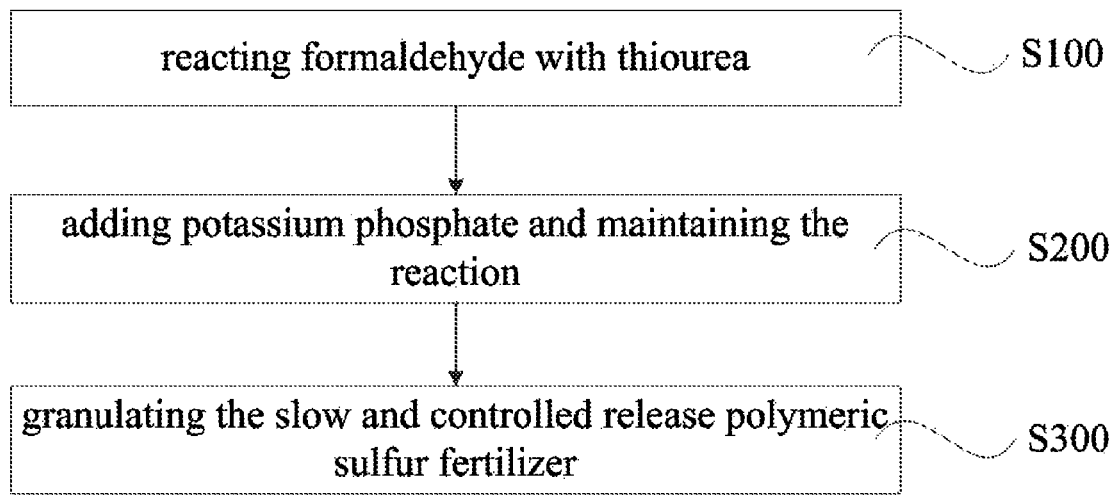
FIG. 2 is a flow chart illustrating a method for preparing slow and controlled release polymeric sulfur fertilizer containing multiple nutrient elements according to another embodiment of the present invention.

The method for preparing the slow and controlled release polymeric sulfur fertilizer according to embodiments of the present invention may prepare the above-mentioned slow and controlled release polymeric sulfur fertilizer efficiently. Referring to FIG. 2, the method for preparing the slow and controlled release polymeric sulfur fertilizer may further include a step S300.

Step S300: granulating the slow and controlled release polymeric sulfur fertilizer.

According to embodiments of the present invention, the slow and controlled release polymeric sulfur fertilizer in the form of viscous solution may be granulated with a granulator and dried, therefore particles of the slow and controlled release polymeric sulfur fertilizer may be obtained.

The method for preparing the slow and controlled release polymeric sulfur fertilizer according to embodiments of the present invention may prepare the above-mentioned slow and controlled release polymeric sulfur fertilizer efficiently.

The present invention may be described with reference to the following embodiments. It is to be noted that, these embodiments are descriptive and should not be construed as a limit to the scope of the present invention in any way.

Embodiment 1

Formulation of Raw Materials 17.8 mL of formaldehyde (37 wt %) solution, KOH (5 wt %) solution, 22.8 g of thiourea, 8.2 g of potassium dihydrogen phosphate.

Preparing Method:

The formaldehyde solution and the thiourea were mixed in a reactor to form a first solution, and pH value of the first solution was adjusted to 10 by the KOH solution. Then the formaldehyde solution and the thiourea were reacted at 35° C. for 3 h, and then reacted at a temperature varied from 80° C. to 90° C. for 20 min. Then the potassium dihydrogen phosphate was added to the reacting system and the reaction was kept for another 270 min, until the reacting solution formed a viscous solution. The viscous solution was granulated with a granulator and dried, thus obtain particles of the slow and controlled release polymeric sulfur fertilizer containing multiple nutrient elements.

Embodiment 2

Formulation of Raw Materials 17.8 mL of formaldehyde (37 wt %) solution, KOH (5 wt %) solution, 22.8 g of thiourea, 8.2 g of potassium dihydrogen phosphate.

Preparing Method:

The formaldehyde solution and the thiourea were mixed in a reactor to form a first solution, and pH value of the first solution was adjusted to 10 by the KOH solution. Then the formaldehyde solution and the thiourea were reacted at 35° C. for 3 h, and then reacted at a temperature varied from 80° C. to 90° C. for 20 min. Then the potassium dihydrogen phosphate was added to the reacting system and the reaction was kept for another 240 min, until the reacting solution formed a viscous solution. The viscous solution was granulated with a granulator and dried, thus obtain particles of the slow and controlled release polymeric sulfur fertilizer containing multiple nutrient elements.

Embodiment 3

Formulation of Raw Materials 88.5 mL of formaldehyde (37 wt %) solution, KOH (5 wt %) solution, 114.0 g of thiourea, 40.8 g of potassium dihydrogen phosphate.

Preparing Method:

The present preparing method is the substantially the same as that described in Embodiment 1.

Embodiment 4

Formulation of Raw Materials 88.5 mL of formaldehyde (37 wt %) solution, KOH (5 wt %) solution, 114.0 g of thiourea, 40.8 g of potassium dihydrogen phosphate.

Preparing Method:

The formaldehyde solution and the thiourea were mixed in a reactor to form a first solution, and pH value of the first solution was adjusted to 10 by the KOH solution. Then the formaldehyde solution and the thiourea were reacted at 35° C. for 3 h, and then reacted at a temperature varied from 80° C. to 90° C. for 20 min. Then the potassium dihydrogen phosphate was added to the reacting system and the reaction was kept for another 260 min, until the reacting solution formed a viscous solution. The viscous solution was granulated with a granulator and dried, thus obtain particles of the slow and controlled release polymeric sulfur fertilizer containing multiple nutrient elements.

Test

1) Each of the slow and controlled release polymeric sulfur fertilizers obtained from Embodiments 1 to 4 was tested, and the solubility, molecular weight, chemical structure and slow and controlled release performances of these slow and controlled release polymeric sulfur fertilizers were detected.

2) Testing method and Result

Solubility in cold water: 5.0 g (with an accuracy of 0.0001) of dried slow and controlled release polymeric sulfur fertilizer and 100 mL of distilled water were mixed uniformly in an Erlenmeyer flask by shaking. Then the Erlenmeyer flask was sealed and rested in a constant temperature and humidity box at a temperature of 25° C. for 24 h. And then the solution in the Erlenmeyer flask was vacuum filtered with a G3 funnel having a sand core, and dried in an oven at 80° C. Finally the solubility in cold water was calculated.

Solubility in hot water: 5.0 g (with an accuracy of 0.0001) of dried slow and controlled release polymeric sulfur fertilizer and 100 mL of distilled water were mixed uniformly in a 250 mL flask. Then the solution in the flask was heated and refluxed for 24 h, and then cooled to room temperature. The solution in the flask was vacuum filtered with a G3 funnel having a sand core, and dried in an oven at 80° C. Finally the solubility in hot water was calculated.

Molecular weight: tested by gel permeation chromatography.

Chemical structure: tested by infrared chromatography and nuclear magnetic resonance spectroscopy.

Slow and controlled release performances: 5.0 g (with an accuracy of 0.0001) of dried slow and controlled release polymeric sulfur fertilizer and 100 mL of distilled water were mixed in a 200 ml Erlenmeyer flask. Then the flask was placed in a constant temperature and humidity box at 25° C. Then the following cycle was performed: the solution in the flask was vacuum filtered with a G3 funnel having a sand core, then the filtered fertilizer was returned to the flask and mixed with 100 mL fresh distilled water. For each cycle, the above steps were repeated for three times. The cycle was performed at the third, fifth, seventh, tenth, fourteenth and twenty eighth days from the first day. The obtained filtrate was tested, and the contents of total nitrogen, total phosphor, total potassium and total sulfur were detected. After the filtrate was subjected to a heating digestion process, the content of nitrogen was measured by using the Kjeldahl Method, the content of total sulfur was measured by using the $BaSO_4$ turbidimetry method, the content of total phosphor was measured by using the Mo—Sb—Sc colorimetric method, and the content of total potassium was measured by using the flame photometer.

TABLE 1

| Solubility<br>Embodiment | Solubility in<br>cold water (%) | Solubility in<br>hot water (%) |
| --- | --- | --- |
| Embodiment 1 | 23.6 | 78.4 |
| Embodiment 2 | 24.7 | 75.6 |
| Embodiment 3 | 22.1 | 72.1 |
| Embodiment 4 | 21.5 | 69.2 |

The solubility in both cold and hot water of each of the slow and controlled release polymeric sulfur fertilizer obtained from Embodiments 1 to 4 was shown in Table 1. It can be concluded that, the slow and controlled release polymeric sulfur fertilizer has a solubility in cold water greater than 20% but lower than 25%, which indicates that the content of quick-acting components in the slow and controlled release polymeric sulfur fertilizer was more than 20%. The slow and controlled release polymeric sulfur fertilizer has a solubility in hot water greater than 69%, which indicates that the content of long-acting components in the slow and controlled release polymeric sulfur fertilizer was more than 69%.

Figure 3:
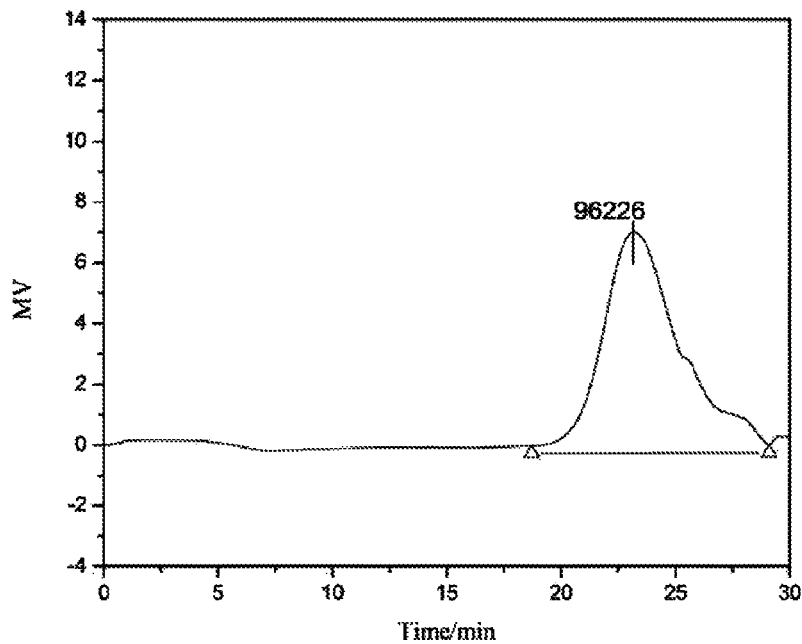
FIG. 3 shows a gel-permeation chromatograph (GPC) diagram of a slow and controlled release polymeric sulfur fertilizer containing multiple nutrient elements according to an embodiment of the present invention.

FIG. 3 is a GPC diagram of a slow and controlled release polymeric sulfur fertilizer containing multiple nutrient elements obtained from Embodiment 1. After calculated, the slow and controlled release polymeric sulfur fertilizer has a number average molecular weight of $M_n$=4737 Daltons, a weight average molecular weight $M_w$=53005 Daltons, a Z-average molecular weight $M_Z$=75717 Daltons, a Z+1-average molecular weight $M_{Z+1}$=82717 Daltons, and a polydispersity of 11.189417. Therefore, it can be concluded that, the structure of the slow and controlled release polymeric sulfur fertilizer obtained from Embodiment 1 is consistent with the two basic features of the molecular weight of polymers: 1) the molecular weight of polymer is several orders of magnitude (generally vary from $10^3$ to $10^7$) larger than that of the hypmolecule; 2) the molecular weight is not uniform, which has polydispersity. Therefore, it is indicated that the slow and controlled release polymeric sulfur fertilizer containing multiple nutrient elements obtained from Embodiment 1 is a polymer.

Figure 4:
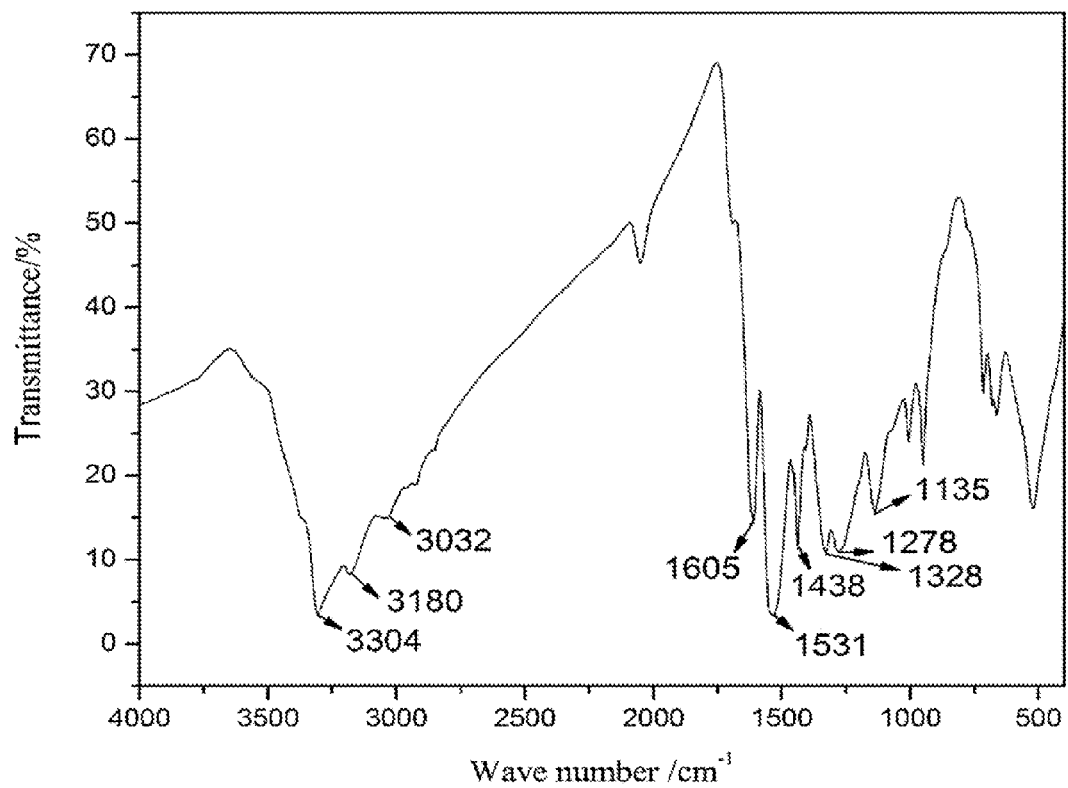
FIG. 4 shows an infrared absorption spectrometry (FTIR) of a slow and controlled release polymeric sulfur fertilizer containing multiple nutrient elements according to an embodiment of the present invention.

FIG. 4 is an infrared absorption spectrometry of a slow and controlled release polymeric sulfur fertilizer containing multiple nutrient elements obtained from Embodiment 1. As shown in this figure, absorption peaks representing —OH were found at both 3304 $cm^{-1}$ and 1328 $cm^{-1}$, absorption peaks representing —$NH_2$ were found at both 3180 $cm^{-1}$ and 1605 $cm^{-1}$, absorption peaks representing —$CH_2$— were found at both 3032 $cm^{-1}$ and 1438 $cm^{-1}$, an absorption peak representing P=O was found at 1278 $cm^{-1}$, an absorption peak representing C=S was found at 1135 $cm^{-1}$, and an absorption peak representing —NH— was found at 1531 $cm^{-1}$.

Figure 5:
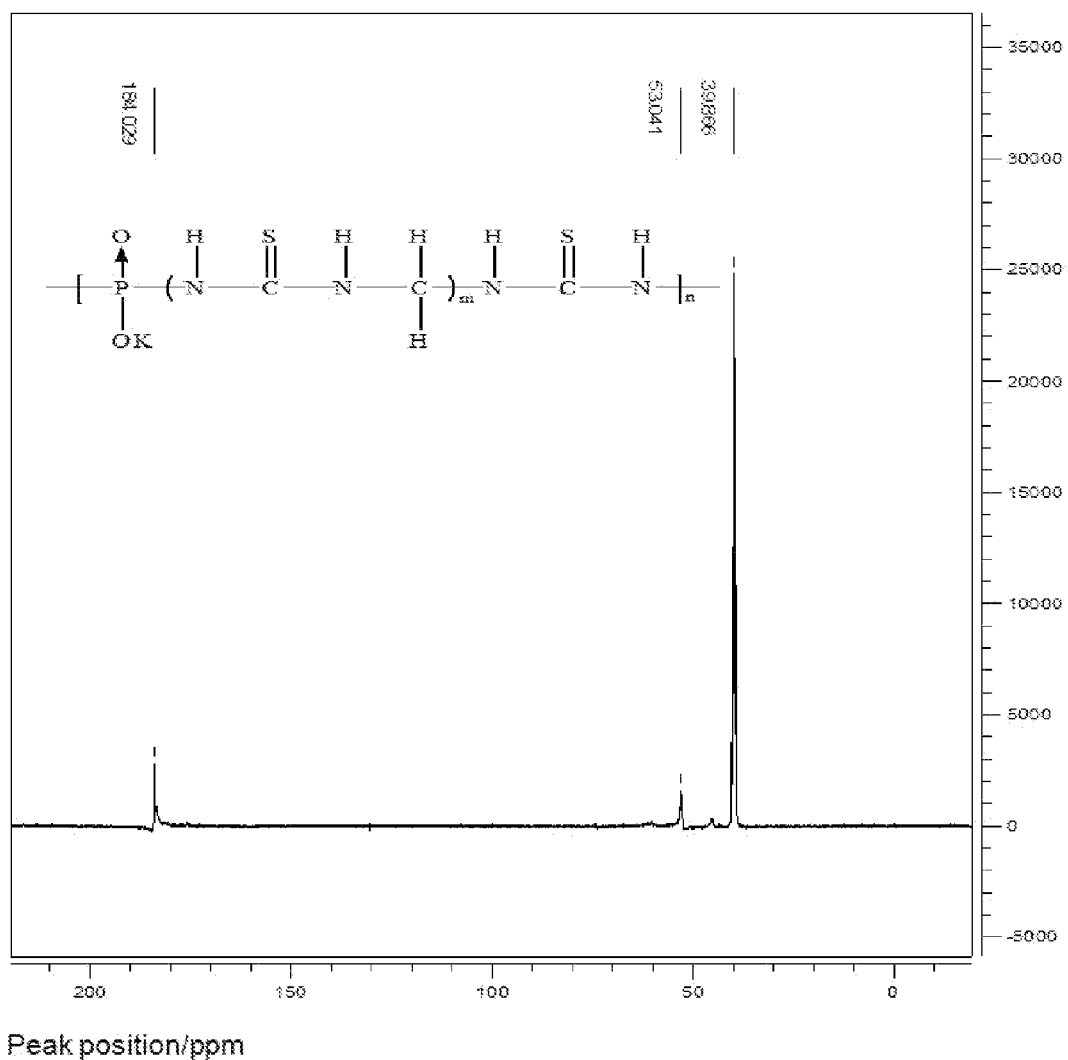
FIG. 5 shows a $^{13}C$ nuclear magnetic resonance spectroscopy ($^{13}C$-NMR) spectrum of a slow and controlled release polymeric sulfur fertilizer containing multiple nutrient elements according to an embodiment of the present invention.

FIG. 5 is a $^{13}$C-NMR spectrum of a slow and controlled release polymeric sulfur fertilizer containing multiple nutrient elements obtained from Embodiment 1. As shown in this figure, the multimodal peak found at a chemical shift of 39.87 ppm is an absorption peak of the solvent deuterated DMSO, an absorption peak representing the carbon in the methylene group (—$CH_2$—) was found at a chemical shift of 53.04 ppm, and an absorption peak representing the carbon of the thioacid amide group (—NH—C(S)—NH—) was found at a chemical shift of 184.03 ppm, which indicates that the slow and controlled release polymeric sulfur fertilizer containing multiple nutrient elements obtained from Embodiment 1 contains two types of carbon atoms present in two different chemical environment respectively.

Figure 6:
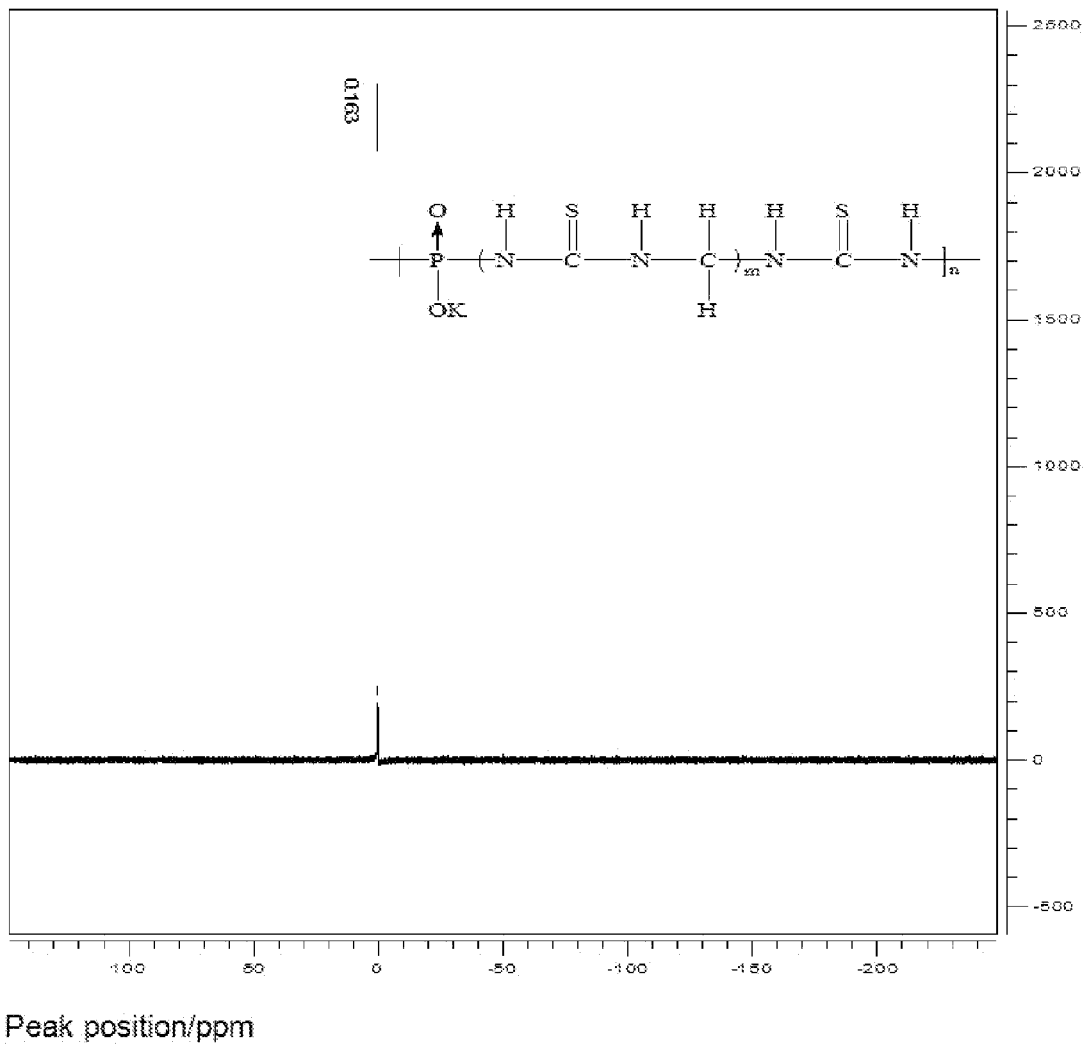
FIG. 6 shows a $^{31}P$ nuclear magnetic resonance spectroscopy ($^{31}P$-NMR) spectrum of a slow and controlled release polymeric sulfur fertilizer containing multiple nutrient elements according to an embodiment of the present invention.

FIG. 6 is a $^{31}$P-NMR spectrum of a slow and controlled release polymeric sulfur fertilizer containing multiple nutrient elements obtained from Embodiment 1. As the thioacid amide group is the electron-donating group, after bond with phosphor (P), the density of the electron atmosphere of P in the potassium dihydrogen phosphate is increased and the chemical shift δ value of the same was reduced. Referring to this figure, the P which is bond with —NH—C(S)—NH— can be found at a chemical shift of δ=0.16 ppm. With an analysis of the infrared spectrum, $^{13}$C-NMR spectrum and $^{31}$P-NMR of the slow and controlled release polymeric sulfur fertilizers obtained from embodiments of the present invention, it is determined that the structure of the prepared slow and controlled release polymeric sulfur fertilizer is consistent with that of the presumed polymer.

Figure 7:
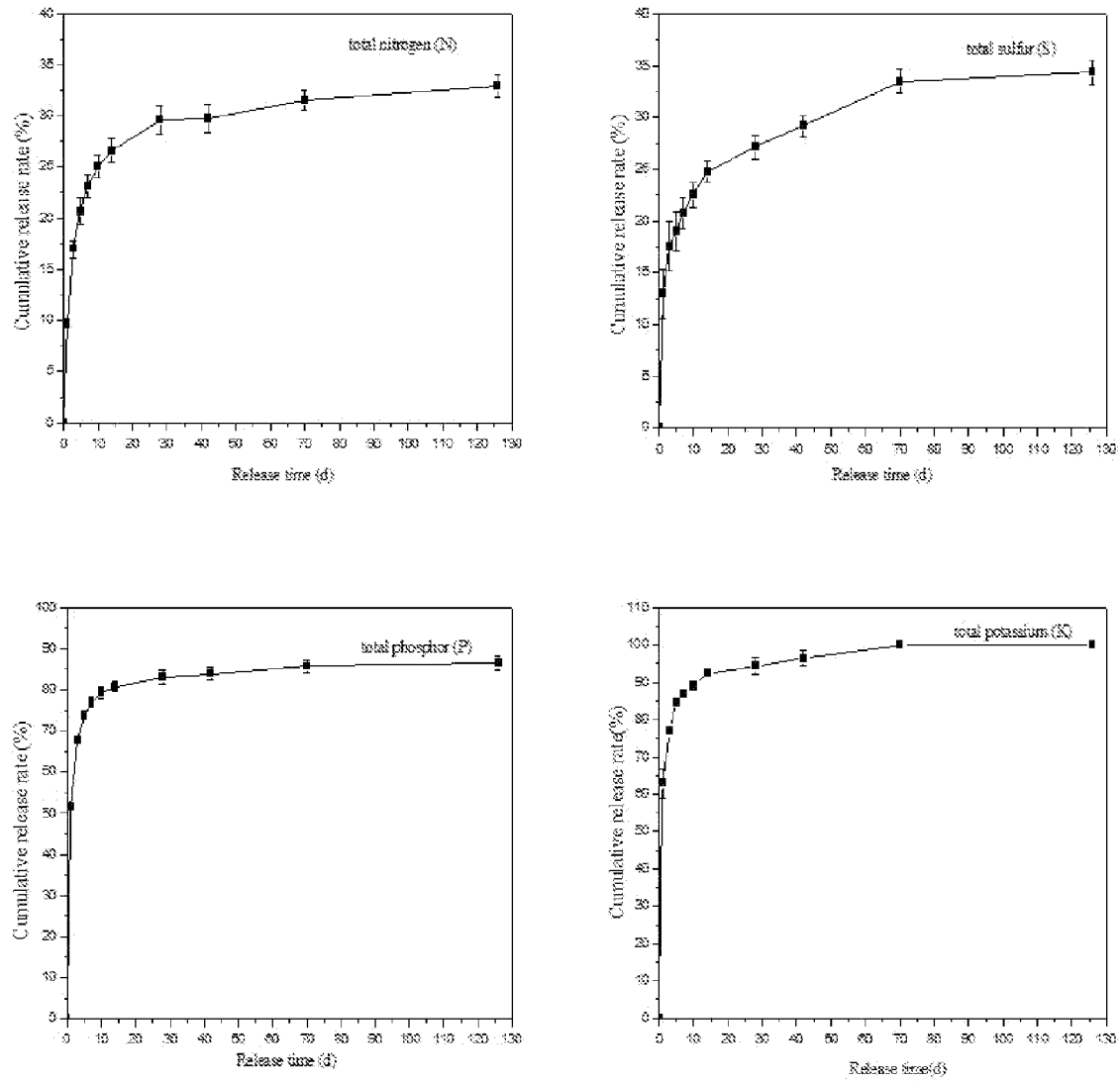
FIG. 7 is the nutrient release curves showing the release of elements nitrogen, sulfur, phosphor and potassium in a slow and controlled release polymeric sulfur fertilizer containing multiple nutrient elements according to an embodiment of the present invention.

FIG. 7 is under 25° C., the cumulative nutrient release curves showing the release of elements nitrogen, sulfur, phosphor and potassium in a slow and controlled release polymeric sulfur fertilizer containing multiple nutrient elements obtained from Embodiment 3. It can be seen that, the four curves all ascend rapidly at first and then move smoothly. Among them, within one day, the cumulative release rate of nitrogen is 9.7%<15%, the cumulative release rate of sulfur is 12.9%<15%, the cumulative release rate of phosphor is 51.5%, the cumulative release rate of potassium is 62.9%. Within twenty-eighth day, the cumulative release rate of nitrogen is 29.6%<75%, the cumulative release rate of sulfur is 27.1%<75%, the cumulative release rate of phosphor is 83.1%, and the cumulative release rate of potassium is 94.3%. Therefore, it can be concluded that the slow and controlled release polymeric sulfur fertilizer has excellent slow and controlled release performances and meet the specific standard under 25° C. that Trenkel presents as a slow release and controlled release fertilizer should have.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present invention. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. A slow and controlled release polymeric sulfur fertilizer comprising multiple nutrient elements, wherein the slow and controlled release polymeric sulfur fertilizer is represented by the following formula:

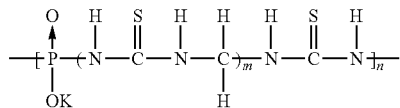

wherein m=1-4, and n=100-210.

2. The slow and controlled release polymeric sulfur fertilizer according to claim 1, wherein the contents of sulfur, nitrogen, phosphor and potassium in the slow and controlled release polymeric sulfur fertilizer are:

24-30 wt % of sulfur;
21-27 wt % of nitrogen;
13-27 wt % of phosphor based on $P_2O_5$; and
9-18 wt % of potassium based on $K_2O$.

3. The slow and controlled release polymeric sulfur fertilizer according to claim 1, wherein the slow and controlled release polymeric sulfur fertilizer has an average molecular weight from 52800 Daltons to 55440 Daltons.

4. A method for preparing the slow and controlled release polymeric sulfur fertilizer containing multiple nutrient elements according to claim 1, wherein the method comprises steps of:

1) reacting formaldehyde with thiourea at a pH value from 8 to 10 at a first temperature from 30° C. to 35° C. for 3 h, then increasing the first temperature to a second temperature from 80° C. to 90° C., and keeping the reaction at the second temperature for a time from 20 min to 30 min to form a preliminary product;

2) adding a potassium phosphate into the preliminary product obtained from step 1) and keep said reaction for a time from 180 min to 270 min to form the slow and controlled release polymeric sulfur fertilizer.

5. The method for preparing the slow and controlled release polymeric sulfur fertilizer according to claim 4, wherein in step 1), the molar ratio between the thiourea and the formaldehyde is from 5:4 to 2:1.

6. The method for preparing the slow and controlled release polymeric sulfur fertilizer according to claim 4, wherein the amount of the potassium phosphate is ⅕ of the molar weight of the thiourea.

7. The method for preparing the slow and controlled release polymeric sulfur fertilizer according to claim 4, wherein the potassium phosphate is at least one selected from the group consisting of potassium dihydrogen phosphate and dipotassium hydrogen phosphate.

8. The method for preparing the slow and controlled release polymeric sulfur fertilizer according to claim 4, further comprising: 3) granulating the slow and controlled release polymeric sulfur fertilizer obtained from step 2).

9. The method for preparing the slow and controlled release polymeric sulfur fertilizer according to claim 4, wherein in step 1), the molar ratio between the thiourea and the formaldehyde is 5:4.

10. The method for preparing the slow and controlled release polymeric sulfur fertilizer according to claim 4, wherein the potassium phosphate is potassium dihydrogen phosphate.

* * * * *